US009008055B2

(12) United States Patent
Anderson

(10) Patent No.: US 9,008,055 B2
(45) Date of Patent: Apr. 14, 2015

(54) AUTOMATIC REMOTE SERVICES PROVIDED BY A HOME RELATIONSHIP BETWEEN A DEVICE AND A SERVER

(75) Inventor: Eric C. Anderson, Gardnerville, NV (US)

(73) Assignee: KDL Scan Designs LLC, Dover, DE (US)

( * ) Notice: Subject to any disclaimer, the term of this patent is extended or adjusted under 35 U.S.C. 154(b) by 3417 days.

(21) Appl. No.: 10/903,931

(22) Filed: Jul. 29, 2004

(65) Prior Publication Data

US 2006/0013197 A1 Jan. 19, 2006

(51) Int. Cl.
*H04Q 7/24* (2006.01)
*H04L 29/08* (2006.01)
*H04L 29/06* (2006.01)
*H04W 12/06* (2009.01)
*H04W 4/00* (2009.01)
*H04W 8/00* (2009.01)
(Continued)

(52) U.S. Cl.
CPC .............. *H04L 67/26* (2013.01); *H04L 63/08* (2013.01); *H04W 12/06* (2013.01); *H04L 67/36* (2013.01); *H04L 67/04* (2013.01); *H04W 4/00* (2013.01); *H04W 8/005* (2013.01); *H04W 8/245* (2013.01); *H04W 12/00* (2013.01); *H04W 84/12* (2013.01); *H04L 67/34* (2013.01)

(58) Field of Classification Search
USPC ......... 709/219, 238, 206, 202, 203, 225, 250, 709/223, 226; 455/575.3, 452, 450, 433, 455/517, 449, 219, 206, 22, 203, 225, 250, 455/456.1, 557, 412.1, 458, 556.1, 418, 455/414.1; 348/207.2, 207.1, 211.2; 370/255, 338, 351
See application file for complete search history.

(56) References Cited

U.S. PATENT DOCUMENTS 5,966,705 A    10/1999  Koneru et al.
6,091,956 A    7/2000   Hollenberg
(Continued)

FOREIGN PATENT DOCUMENTS

EP         1058450        12/2000
WO    WO 02057869    *  8/2002
WO    WO 03/024094 A1 *  3/2003 ............. H04N 5/225

OTHER PUBLICATIONS

Anderson, Eric C., "Establishing a Home Relationship Between a Wireless Device and a Server in a Wireless Network," U.S. Appl. No. 10/833,381, filed Apr. 28, 2004.
(Continued)

*Primary Examiner* — Joseph Arevalo
(74) *Attorney, Agent, or Firm* — Stolowitz Ford Cowger LLP

(57) ABSTRACT

A method is provided for automatically providing remote services for a mobile device having an established relationship with a server of a home network. After the relationship between the mobile device and the server has been set-up and the device detects a local network that is separate and remote from the home network, a connection is automatically established between the mobile device and a local network. The device then automatically establishes an Internet connection with the server through the local network, and transmits to the server information that was stored in the mobile device when the relationship was established. In response to the server recognizing the device through the transmitted information, the server automatically activates at least one service to initiate a transfer data, such as uploading images between the device and the server through the local network.

42 Claims, 2 Drawing Sheets

(51) Int. Cl.
    *H04W 8/24*    (2009.01)
    *H04W 12/00*   (2009.01)
    *H04W 84/12*   (2009.01)

(56) References Cited

U.S. PATENT DOCUMENTS

| | | | |
|---|---|---|---|
| 6,119,001 A | 9/2000 | Delis et al. | |
| 6,332,579 B1 | 12/2001 | Ritter | |
| 6,449,473 B1 | 9/2002 | Raivisto | |
| 6,502,192 B1 | 12/2002 | Nguyen | |
| 6,542,740 B1 | 4/2003 | Olgaard et al. | |
| 6,639,975 B1 | 10/2003 | O'Neal et al. | |
| 6,670,982 B2 | 12/2003 | Clough et al. | |
| 6,816,722 B2 | 11/2004 | Blom et al. | |
| 6,930,709 B1 | 8/2005 | Creamer et al. | |
| 6,937,850 B2 | 8/2005 | Lippelt | |
| 6,950,628 B1 | 9/2005 | Meier et al. | |
| 6,967,675 B1 | 11/2005 | Ito et al. | |
| 7,054,618 B1 | 5/2006 | McCullough | |
| 7,085,360 B1 | 8/2006 | Sprouse | |
| 7,106,176 B2* | 9/2006 | La et al. | 340/286.01 |
| 7,266,383 B2* | 9/2007 | Anderson | 455/518 |
| 2001/0003191 A1* | 6/2001 | Kovacs et al. | 709/226 |
| 2001/0054101 A1 | 12/2001 | Wilson | |
| 2002/0022474 A1 | 2/2002 | Blom et al. | |
| 2002/0114469 A1 | 8/2002 | Faccin et al. | |
| 2002/0137544 A1* | 9/2002 | Myojo | 455/557 |
| 2003/0025796 A1* | 2/2003 | Yamagishi | 348/207.2 |
| 2003/0030839 A1 | 2/2003 | Walters et al. | |
| 2003/0054810 A1 | 3/2003 | Chen et al. | |
| 2003/0054833 A1* | 3/2003 | Hayduk | 455/456 |
| 2003/0058343 A1 | 3/2003 | Katayama | |
| 2003/0065824 A1* | 4/2003 | Kudo | 709/250 |
| 2003/0078959 A1 | 4/2003 | Yeung et al. | |
| 2003/0157960 A1* | 8/2003 | Kennedy | 455/556 |
| 2003/0200297 A1 | 10/2003 | Wiener | |
| 2003/0204445 A1 | 10/2003 | Vishik et al. | |
| 2003/0207685 A1* | 11/2003 | Rankin | 455/433 |
| 2003/0220765 A1 | 11/2003 | Overy et al. | |
| 2003/0225701 A1 | 12/2003 | Lee et al. | |
| 2003/0227554 A1 | 12/2003 | Kazami et al. | |
| 2003/0232598 A1 | 12/2003 | Aljadeff et al. | |
| 2004/0003285 A1 | 1/2004 | Whelan et al. | |
| 2004/0032498 A1 | 2/2004 | Wyn-Harris et al. | |
| 2004/0039813 A1 | 2/2004 | Clark et al. | |
| 2004/0046868 A1 | 3/2004 | Anderson et al. | |
| 2004/0082326 A1 | 4/2004 | Shaw et al. | |
| 2004/0098515 A1 | 5/2004 | Rezvani et al. | |
| 2004/0132449 A1 | 7/2004 | Kowarsch | |
| 2004/0151311 A1* | 8/2004 | Hamberg et al. | 380/44 |
| 2004/0185826 A1 | 9/2004 | Koskinen et al. | |
| 2004/0192268 A1* | 9/2004 | Pyhalammi | 455/414.1 |
| 2004/0201702 A1* | 10/2004 | White | 348/207.99 |
| 2004/0203848 A1* | 10/2004 | Kumar | 455/456.1 |
| 2004/0225614 A1 | 11/2004 | Arnold et al. | |
| 2004/0248547 A1 | 12/2004 | Philsgard et al. | |
| 2004/0249922 A1 | 12/2004 | Hackman et al. | |
| 2005/0021724 A1* | 1/2005 | Kung et al. | 709/223 |
| 2005/0027608 A1 | 2/2005 | Wiesmuller et al. | |
| 2005/0033850 A1 | 2/2005 | Kirkland | |
| 2005/0063355 A1* | 3/2005 | Iwamura | 370/351 |
| 2005/0146621 A1* | 7/2005 | Tanaka et al. | 348/211.2 |
| 2005/0241004 A1* | 10/2005 | Pyhalammi | 726/29 |
| 2005/0257055 A1* | 11/2005 | Anderson | 713/170 |

OTHER PUBLICATIONS

Anderson, Eric C. et al., "Method and System for Supporting Guest Services Provided by a Wireless LAN," U.S. Appl. No. 10/893,806, filed Jul. 19, 2004.

Anderson, Eric C. et al., "Automatic Registration Services Provided Through a Home Relationship Established Between a Device and a Local Area Network," U.S. Appl. No. 10/859,735, filed Jun. 2, 2004.

* cited by examiner

AUTOMATIC REMOTE SERVICES PROVIDED BY A HOME RELATIONSHIP BETWEEN A DEVICE AND A SERVER

FIELD OF THE INVENTION

The present invention relates to computer networks, and more particularly to a method and system for establishing a home relationship between a mobile device and a network, and providing automatic remote services between the device and the home network through a remote network.

BACKGROUND OF THE INVENTION

A wireless LAN is a local area network that transmits over the air. Typically, one or more wireless base stations, which are also referred to as access points, are wired to an Ethernet network, while wireless adapters are either built into or attached to wireless devices. The access points and the wireless devices communicate via radio frequency over an area of several hundred feet through walls and other barriers. If there are multiple access points as in a corporation, for example, then roaming devices can be handed-off from one access point to another. One example of a wireless LAN standard today is 802.11, also called Wi-Fi. For short distances between two devices, a wireless personal area network (PAN) may be used, such as Bluetooth. Bluetooth is an open standard for short-range transmission of digital voice and data between local devices, such as laptops, PDAs, imaging devices, phones, and desktop devices.

One application for a wireless LAN is in the home for connecting two or more computers/devices. A home LAN is often the same Ethernet network found in companies, except that the home network is typically configured as one network, whereas a company may have many subnetworks for traffic and security purposes. Another application for a wireless LAN is so called "hot spots" in which public locations, such as coffee shops, hotels, restaurants, airports, etc., provide wireless internet access to end-users utilizing Wi-Fi standards.

Not only is the number of wireless mobile devices being introduced to the market steadily increasing, but the types of devices equipped with wireless technology is also growing. For example, Bluetooth-enabled camcorders are now available. Currently, each wireless device, such as a camcorder or digital camera, is designed to work with any device connected to it that has appropriate connectivity, such as software and/or hardware drivers.

When a user is carrying a device capable of wireless networking with them, they are currently limited in what they can do when within the service area of a wireless local network. Typically, wireless networks are secure (no access), or, if not secure, then of unknown capability. A certain level of technical expertise is required to make anything work, and the range of possibilities is limited typically to devices from the same manufacturer or devices from a group of manufacturers.

Accordingly, given the proliferation of hot spots and wireless devices, there exists a need for a method and system that unlocks the full potential of wireless devices. More particularly, what is needed is a method and system that provides automatic remote service to wireless device through remote hotspots. The present invention addresses such a need.

SUMMARY OF THE INVENTION

The present invention provides a method for automatically providing remote services for a mobile device having an established relationship with a server of a home network. After the relationship between the mobile device and the server has been set-up and the device detects a local network that is separate and remote from the home network, a connection is automatically established between the mobile device and a local network. The device then automatically establishes an Internet connection with the server through the local network, and transmits to the server information that was stored in the mobile device when the relationship was established. In response to the server recognizing the device through the transmitted information, the server automatically activates at least one service to initiate a transfer data, such as uploading images, between the device and the server through the local network.

According to the method and system disclosed herein, the present invention enables a "home" network to provide automated services to the mobile device when visiting other networks as if the device was connected locally to the home network. Examples of the automated services include automatic image uploads if the device is a wireless imaging device, such as a camera phone or digital camera, and automated product registration and software updates.

DETAILED DESCRIPTION

The present invention provides a method and network for automatic remote services between a device and a home network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a method and system for automatic remote services for a wireless mobile device through the establishment of a "home" relationship between the device and a server. First, a home relationship is established between the device and a home network in which information identifying the device is stored on the server that allows it to interact with the device, and information identifying the network is loaded into the device to enable the device to interact with the home server. Once this relationship is established, the server may be configured to perform automatic services for the device, such as uploading images from a camera phone to the server when the camera phone is detected by the home network. According to the present invention, however, these automatic services may be provided by the server even when a user of the mobile device is traveling and the mobile device comes in contact with other local networks or hotspots. In the remote case when the device detects a local network away from the home network, information packets within the device are used to allow the device to establish a VPN-like "tunnel" to the home server from any network access point providing Internet access. The home server recognizes the connection, and operates as if the device was local, including providing the automatic services a user has previously selected.

An example of using the present invention is a user on vacation in which the user has captured images using a camera phone or wireless digital camera. As the user travels to various locations, the device may detect local hotspots, such as at a coffeehouse, or airport, for example. Once the device gains Internet access through the local hotspot and contacts the home server, the home server recognizes the device through the pre-established home relationship and automatically uploads the images from the device, freeing the device to capture more images, all without user intervention.

Figure 1:
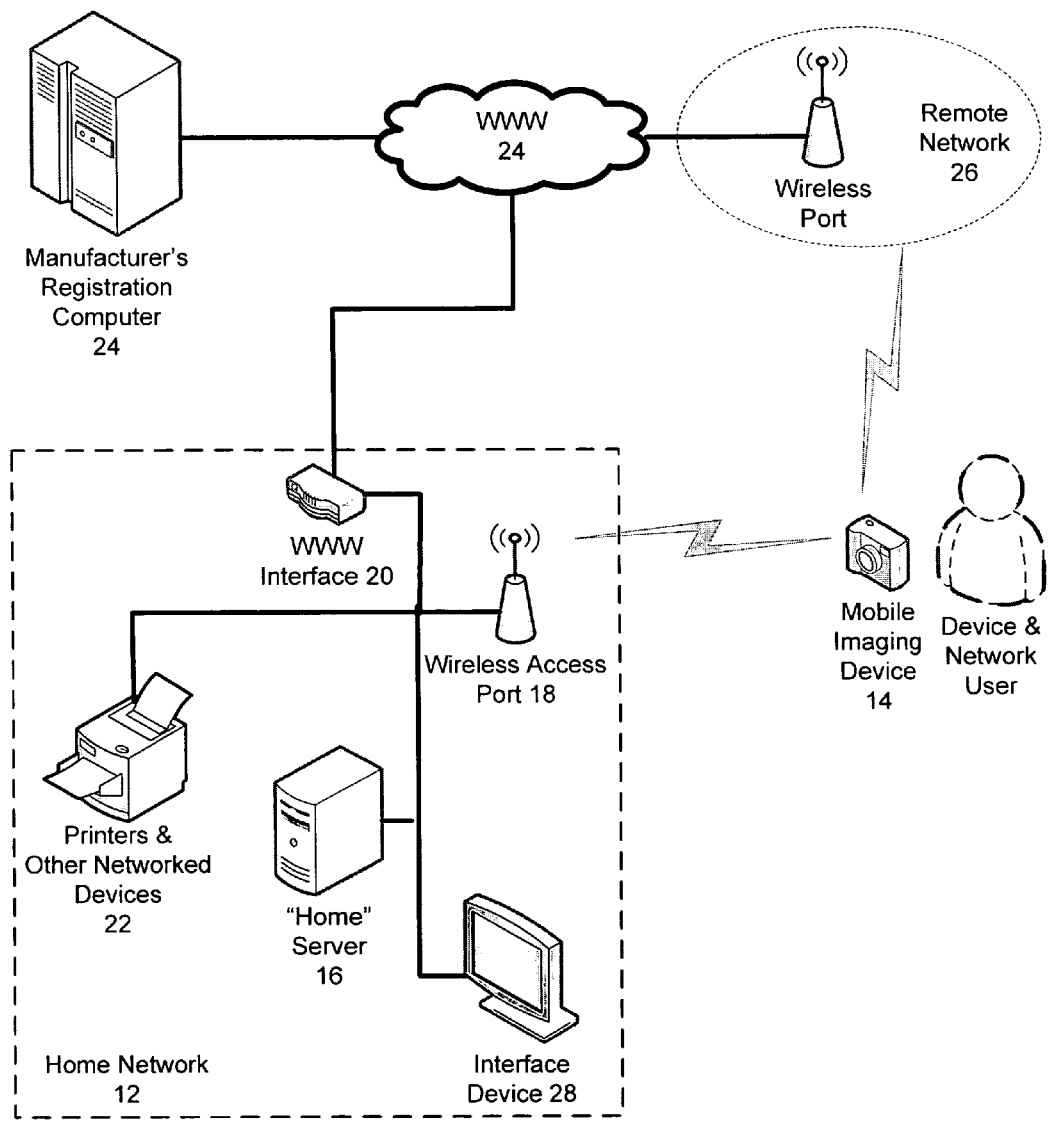
FIG. 1 illustrates a preferred embodiment of a system for providing automatic remote services for a device through the establishment of a "home" relationship with a network server in accordance with the present invention.

FIG. 1 illustrates a preferred embodiment of a system for providing automatic remote services for a device through the establishment of a home relationship with a network server in accordance with the present invention. In a preferred embodiment, the system comprises a wireless home network 12 capable of wireless communication with a wireless mobile device 14. The home network 12 includes at least one server 16, which is operated by a user/owner/administrator through an interface device 28. The server 16 is coupled to one or more wireless access points (transceivers) 18 through a LAN interface (e.g., Ethernet router) 20. Other stationary devices 22 may also be coupled to the LAN interface 20 over a wired LAN, such as a printer, fax machine, music jukebox, and the like. The LAN interface 20 provides all the devices within the home network access to the Internet 24. Although not shown, the mobile device 14 includes a CPU or DSP, volatile and non-volatile memory, a network interface that enables wireless communication, and device specific components for carrying out the intended function of the device 14. In a preferred embodiment of the present invention, the mobile device is capable of capturing images, such as wireless digital camera or camcorder, a camera phone, or a camera-equipped PDA, for example. Also, the server 16 may comprise a standard PC, a network server, or a media server.

When the user purchases the mobile device 14, the home relationship can be established between the server 16 and the mobile device 14. Besides establishing a "home" relationship with the mobile device 14, the server 16 can also establish home relationships with other devices, such as printers and other networked devices 22. The relationship established between the network 12 and the wireless device 14 is the identification of the network 12 or network server 16 as "home" from the point of view of the wireless device 14 and is the identification of an "owned device" from the point of view of the network server 16. The server 16 is capable of connecting to a registration server 24 of a particular owned device through the Internet 24 via the Internet interface 20.

Figure 2:
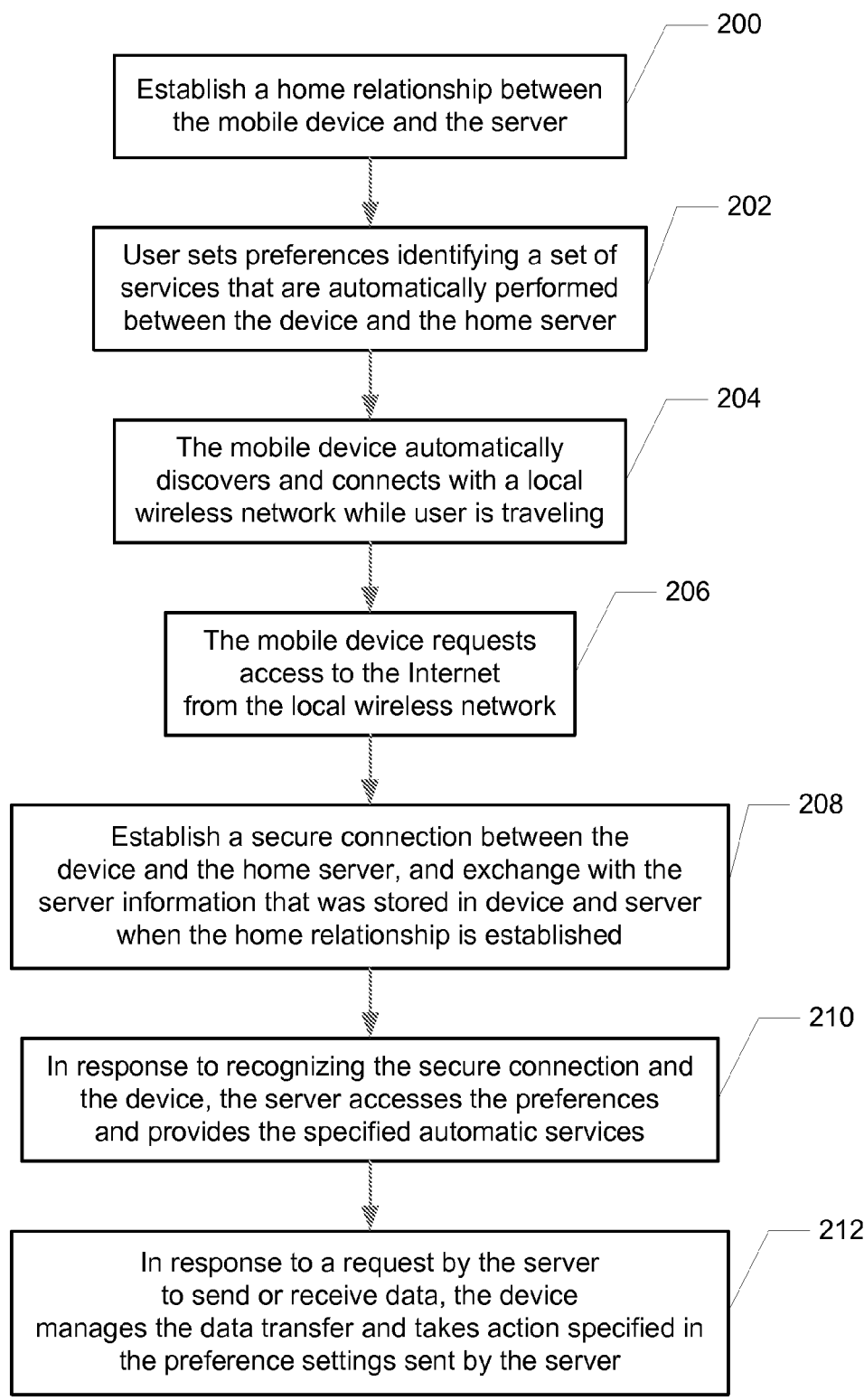
FIG. 2 is a flowchart illustrating a process for providing automatic remote service for the device through the establishment of a home relationship with the network server in accordance with the present invention.

FIG. 2 is a flowchart illustrating a process for providing automatic remote service for the device 14 through the establishment of a home relationship with the network server 16 in accordance with the present invention. The process begins by establishing a "home" relationship between the mobile device 14 and the server 16, via step 200, such that no additional configuration is required by the user 106 of the mobile device 14 to communicate over the home network once the relationship is established. The establishment of the "home" relationship is further described in the co-pending U.S. patent application entitled "Establishing a Home Relationship between a Wireless Device and a Server in a Wireless Network," Ser. No. 10/833,381, filed on Apr. 28, 2004 and incorporated herein by reference.

The process is briefly described here for convenience. When first activating the device 14, the built-in wireless networking capability of the device 14 interacts automatically with the local wireless network 12. Once communication is established, and before any data interactions can proceed, the nature of the relationship between the device 14 and server/network 16 and 12 must be established. This is accomplished by a notification/response between the network and the device 14. The network server 16 attempts to recognize the device 14 by requesting device identification from the mobile device 14. The device identification is information that uniquely identifies the mobile device 14, such as a device ID, serial number, etc. The mobile device 14 responds with its device ID. If the device ID is found in an "owned device" database or list (not shown) at the network server 16, then the mobile device 14 is granted access to the network as being part of the home network 12.

If the device ID is not found, then no pre-existing relationship exists. The network server 16 then seeks authorization from the user to create the home relationship via an audible and/or visual indication that user interaction is required. The user selects from a presented menu from a set of possible relationships. One selection is to establish the network as "home" for the device. When this option is selected by the user, information about the device 14, the device ID, is loaded into the server 16 to allow the server to recognize the device 16 in the future, and likewise, information identifying the server/network 16 is loaded into the device 14 to enable it to interact with the server 16. Information loaded into the device 14 for identifying the server 16 may include an IP address of the server or information necessary for establishing a secure connection, such as a Virtual Private Network (VPN). For business networks, the "home" selection would only be made if the device was owned by the business.

Once the "home" relationship is established between the mobile device 14 and the network server 16, the mobile device 14 recognizes the network as its home network, and the network server 16 recognizes the mobile device 14 as an "owned" device that is an extension of the network. Using the "home" relationship, the mobile device 14 is granted automatic access to the network. Although the preferred embodiment is described above with a "home" relationship established between the network server 16 and the mobile device 14, other types of relationships can be established between the network server 16 and the mobile device 14 without departing from the spirit and scope of the present invention.

After the user authorizes the creation of a home relationship, the user in step 202 sets preferences identifying a set of functions or services that are automatically performed between the device 14 and the home server 16 when a connection is made. In a preferred embodiment, the user is prompted to set preferences by the display of a preference page(s) or form(s). The types of services that may be specified are explained below.

Referring to both FIGS. 1 and 2, in step 204 after the user specifies preferences for automatic services, the user may carry around the device 14 and the mobile device 14 may automatically discover and make a connection with a local wireless network 26. Such local wireless networks may be found in public locations, such as coffee shops, hotels, restaurants, airports, etc., as well as private locations, such as corporations and other people's homes.

In step 206, the mobile device 14 requests access to the Internet from the local wireless network 26. This may require having an account with a service provider, such as T-MOBILE, for example, and thus may require exchange of password and ID. The service provided by the local network 26, enabling a connection to be made between the device 14 and its home network 22 is called "Guest" access. Providing guest access to a local network in this manner is disclosed in co-pending patent application Ser. No. 10/893,806 "Method and System for Supporting Guest Services Provided by a Wireless LAN" (I242), filed on Jul. 19, 2004, and herein incorporated by reference.

After obtaining Internet access, in step 208 the device 14 establishes a secure connection to the home server 16 over the Internet and exchanges with the server 16 information stored in the device and server when the home relationship was established with the server 16. In a preferred embodiment, the secure connection to the home server 16 is established using a Virtual Private Network (VPN) that establishes a "tunnel" to the home server 16 from any network access point providing internet access. Since there is no connection to the network 26 other than a secure "pipe" of data flow between device 14 and home network 22, there is no security issue. The secure connection is established directly—the only service being provided by the remote network 26 is the transport of wireless data to the Internet backbone.

In a preferred embodiment, the information stored in the device 14 includes the name or IP address of the server or VPN information, and unique identification information. The IP address of the server or VPN information is used to establish communication with the home server 16. Thereafter, the device transmits device identifying information (e.g., device ID) to the server 16 and the server 16 transmits network identifying information to the device 14 to establish automatic access.

In an alternate embodiment, a secure connection is established between the device 14 and the home server 16 via a set of encryption keys created when the home relationship was established. In this case, one key of a key pair is held by the device 14 and the other is held by the server 16. The key pair is based on well known public/private key technology, and allows a secure connection by using the keys to encrypt and decrypt messages between the device 14 and server 16. In addition, a mechanism for establishing a connection with the home server 16 is required that would allow passage through a home firewall and router, potentially using NAT (Network Address Translation) if multiple computing devices 14 were included on the home network. This mechanism could include technology within the firewall, or a service provided externally. In the latter case, the external service has a connection established from the home server 16, and is contacted by the mobile device 14 rather than directly to the home network. The service thus would provide a connection between the device 14 and home server 16.

When accessing sensitive information from the home server 16, an additional authentication step may be required, to ensure that the user of the device 14 is the real owner. This is important to protect sensitive data in the case when the device 14 is stolen. This authentication step can be as simple as entering a PIN number, or could be a text password, or some biometric information, such as a fingerprint or thumb-print recognizer. If the device 14 itself requires authentication when powered up—typical for many mobile devices—then the user is already pre-identified as the owner, and no additional step of authentication for accessing sensitive data is required.

In step 210, in response to recognizing the secure connection and the device 14, the home server 16 accesses the preferences and provides the specified automatic services, operating as if the device 14 was local. In the preferred embodiment where the device 14 is an imaging device, such as a camera-phone or digital camera, an example of an automatic service specified in the preference settings is the uploading of new images in the device 14 to the home server 16.

Preferably, image uploads are accomplished in a step-wise manner, allowing partial uploads to be completed at a later time. Assuming a connection is made via a wireless network provided by a restaurant, for example, when the user is standing outside looking at the menu, a new image transfer may begin. If the user decides to pass on the restaurant, and begins walking away, at some point the wireless connection will be broken. Whatever portion of the image transferred will be held, to be completed during later connections.

When an image is completely transferred, there are a number of possible options that may be offered to the user to manage the images within the imaging device 14. The options include:

1. Delete the successfully transferred image completely.
2. Delete the full-size image, and leave a thumbnail image that can be displayed on the device's display. In this case, the thumbnail may be marked as transferred on the display. Several delete options may be displayed to the user, such as "Delete ALL," "Delete This One," "Delete Selected" and "Delete All Transferred." Since a thumbnail is much smaller than the full-size images, the thumbnail images may remain in the imaging device 14 after the images are transferred to the server 16, if the user so desires. These thumbnail images cannot be zoomed on the display unless the full-size images are first retrieved from the server 16.
3. Mark all transferred images as transferred. The user can "free up" memory in the camera by selecting the option "Delete All Transferred."

In addition, an icon or other mark can be displayed on the thumbnail image after images are transferred. For example, an icon may be displayed in one portion of the thumbnail, to indicate that the full-size image has been transferred to the server. For instance, a zoom icon with a red circle and line to it may be used to indicate an image transfer, and a green icon may be displayed on other thumbnails is to indicate that the full-size images are still present in the device 14. This is helpful information for the device 14 user, allowing selective erasure of images no longer needed in the device 14.

Another automatic service that may be provided in the preference settings is to download images or data from the server 16 to the imaging device 14. This would allow, for example, the user to receive images sent from other imaging devices 14 by friends, family, or business associates.

In a further embodiment, the services that the user may select in the preferences may include: product registration; software updates; server operating software to support device; other network device software to support the device; options and accessories. These services include automated software or firmware updates, automatic system software selection and installation, automatic software installation for other network devices to support the mobile device, and special offerings.

Referring again to FIG. 1, to provide automated software or firmware updates, registration information for the mobile device 14 and the server 16 is provided to the registration server 24. The registration server 24 can then connect to the server 16 in the future when software or firmware updates are available for the mobile device 14. If updates are available, they are automatically downloaded and installed on the mobile device 14 by the network server 16. Further details on how this may be implemented are described in co-pending patent application Ser. No. 10/859,735 "AUTOMATIC REGISTRATION SERVICES PROVIDED THROUGH A HOME RELATIONSHIP ESTABLISHED BETWEEN A DEVICE IN A LOCAL AREA NETWORK," filed on Apr. 28, 2004, which is hereby incorporated by reference.

As the server 16 scans the preferences, the server 16 may perform several functions in sequence. For example, to respond to the setting "automatically transfer images", the server 16 may check if images are available in the device 14, compare those images to images previously uploaded, create a list of images to the transferred from the device 14, and then instructs the device 14 to transfer the identified images. The home server 16 may also transfer those preference settings to the device 14 that the server 16 determines require action by the device 14.

Referring again to FIG. 2, in response to a request by the server 16 to send or receive data, in step 212 the device 14 manages the data transfer and takes action specified in the preference settings sent by the server. Such actions may include performing selected operations on transferred data, such as marking transferred data as transferred, and partially deleting (e.g., leaving a thumbnail) or deleting transferred images. One of the preferences may be to store images received from other devices in an in-basket. In the preferred embodiment, the in-basket would be secure as well, eliminating any spam from being received.

Other services can include access to home network functions, such as baby room video cameras, room microphones for listening, air conditioner/heater controls, home weather station, etc. In the example of heating and air conditioning, the device 14 could access current home temperature and outside temperature, as well as current heating/cooling system settings. If the user had the system set to start cooling or heating 1 hour before coming home, and had a schedule change, the settings could be modified directly from his mobile device 14.

Although the preferred embodiment has been described in which image data is transferred between the device 14 and the server 16, any other forms of data can be transferred, such as text, MP3 files, spreadsheets, presentations, documents, and commands.

A method and system for establishing a home relationship between a wireless device and a server in a wireless network has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

The methods described herein can be embodied in executable instructions stored in a computer-readable medium for use by or in connection with an instruction execution machine, system, apparatus, or device, such as a computer-based or processor-containing machine, system, apparatus, or device. As used here, a "computer-readable medium" can include one or more of any suitable media for storing the executable instructions of a computer program in one or more of an electronic, magnetic, optical, and electromagnetic form, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a random access memory (RAM); a read only memory (ROM); an erasable programmable read only memory (EPROM or Flash memory); optical storage devices, including a portable compact disc (CD), a portable digital video disc (DVD), and the like.

I claim:

1. A method for automatically providing remote services for a mobile device having an established relationship with a server of a home network, comprising:
    receiving, by the server, information that was stored in the mobile device when the established relationship was established when the mobile device establishes an Internet connection through a local network that is separate and remote from the home network, wherein establishing the established relationship includes allowing the user to set preferences that identifies at least one service that is automatically performed between the mobile device and the server when a connection is made; and
    if the mobile device is recognized through the received information, automatically activating at least one function within the server to initiate a transfer of data between the mobile device and the server through the local network.

2. The method of claim 1 wherein the established relationship is established by establishing a home relationship between the mobile device and the server of the home network such that no additional configuration is required by a user of the mobile device to communicate over the home network once the relationship is established.

3. The method of claim 2 further including:
    establishing the home relationship by identifying the home network as home in the mobile device, and identifying the mobile device as owned to the server.

4. The method of claim 3 further including:
    establishing the home relationship by loading information identifying the mobile device into the server to allow the server to recognize the mobile device, and loading information identifying the server into the mobile device to enable the mobile device to interact with the server.

5. The method of claim 2 further including: requiring user authorization to create the home relationship.

6. The method of claim 5 further including:
    after the creation of the home relationship is authorized by a user, allowing the user to set preferences that identify a set of services that are automatically performed between the mobile device and the server when a connection is made.

7. The method of claim 6 wherein the automatic services may include any combination of: uploading data, downloading data, automated software or firmware updates, automatic system software selection and installation, and automatic software installation for other network devices to support the mobile device.

8. The method of claim 7 further including:
    utilizing partial data transfers when transferring data between the mobile device and the server such that when the connection with the local network is lost during a data transfer, the data transfer may resume when connection is established with another local network.

9. The method of claim 7 wherein the automatic services include uploading images stored on the mobile device to the server, and downloading images from the server.

10. The method of claim 9 further including offering any combination of the following automatic services when an image is completely transferred: deleting the transferred image completely, deleting a full-size image and leaving a thumbnail image for display, and marking the transfer image has transferred.

11. The method of claim 9 further including: displaying on the mobile device's display an icon or other mark to indicate that the image has been transferred.

12. The method of claim 1 wherein the information stored in the mobile device when the established relationship was established includes a name, IP address of the server, or VPN information, and unique identification information, wherein the name, IP address of the server, or VPN information are used to establish communication with the home server, and the mobile device transmits the information to the server to establish automatic access to the home network.

13. The method of claim 12 further including: transmitting from the server to the mobile device network identifying information.

14. The method of claim 13 wherein the mobile device stores a first key of private/public key pair and the server stores a second key of the pair for encrypting/decrypting data exchanges between the mobile device and the server.

15. A system for automatically providing remote services for a mobile device having an established relationship with a server of a home network, comprising:
   means for receiving, by the server, information that was stored in the mobile device when the established relationship was established when the mobile device establishes an Internet connection through a local network that is separate and remote from the home network, wherein establishing the established relationship includes allowing the user to set preferences that identifies at least one service that is automatically performed between the mobile device and the server when a connection is made; and
   means responsive to the server recognizing the mobile device through the received information for automatically activating at least one function within the server to initiate a transfer of data between the mobile device and the server through the local network.

16. The system of claim 15 wherein the established relationship is established by establishing a home relationship between the mobile device and the server of the home network, such that no additional configuration is required by a user of the mobile device to communicate over the home network once the relationship is established.

17. The system of claim 16 wherein the home relationship is established by identifying the home network as home in the mobile device, and identifying the mobile device as owned to the server.

18. The system of claim 17 wherein the home relationship is established by loading information identifying the mobile device into the server to allow the server to recognize the mobile device, and loading information identifying the server into the mobile device to enable the mobile device to interact with the server.

19. The system of claim 15 wherein user authorization is required to create the home relationship.

20. The system of claim 19 wherein after creation of the home relationship is authorized by a user, the user is prompted to set preferences that identify a set of services that are automatically performed between the mobile device and the server when a connection is made.

21. The system of claim 20 wherein the automatic services include any combination of: uploading data, downloading data, automated software or firmware updates, automatic system software selection and installation, and automatic software installation for other network devices to support the mobile device.

22. The system of claim 21 wherein partial data transfers are utilized when transferring data between the mobile device and the server such that when the connection with the local network is lost during a data transfer, the data transfer may resume when connection is established with another local network.

23. The system of claim 21 wherein the automatic services include uploading images stored on the mobile device to the server, and downloading images from the server.

24. The system of claim 23 wherein any combination of the following automatic services are offered when an image is completely transferred: deleting the transferred image completely, deleting a full-size image and leaving a thumbnail image for display, and marking the transfer image has transferred.

25. The system of claim 23 wherein an icon or other mark is displayed on the mobile device's display to indicate that the image has been transferred.

26. The system of claim 15 wherein the information stored in the mobile device when the established relationship was established includes a name, IP address of the server, or VPN information, and unique identification information, wherein the name, IP address of the server, or VPN information are used to establish communication with the home server, and the mobile device transmits the mobile device identifying information to the server to establish automatic access to the home network.

27. The system of claim 26 wherein the server transmits to the mobile device network identifying information.

28. The system of claim 27 wherein the mobile device stores a first key of private/public key pair and the server stores a second key of the pair for encrypting/decrypting data exchanges between the mobile device and the server.

29. A non-transitory computer-readable medium containing program instructions for automatically providing remote services for a mobile device having an established relationship with a server of a home network, the program instructions for:
   receiving, by the server, information that was stored in the mobile device when the established relationship was established when the mobile device establishes an Internet connection through a local network that is separate and remote from the home network, wherein establishing the established relationship includes allowing the user to set preferences that identifies at least one service that is automatically performed between the mobile device and the server when a connection is made; and
   in response to recognizing the mobile device through the received information, automatically activating at least one function within the server to initiate a transfer of data between the mobile device and the server through the local network.

30. The non-transitory computer-readable medium of claim 29 further including instructions for: establishing the established relationship by establishing a home relationship between the mobile device and the server of the home network such that no additional configuration is required by a user of the mobile device to communicate over the home network once the relationship is established.

31. The non-transitory computer-readable medium of claim 30 further including instructions for: establishing the home relationship by identifying the home network as home in the mobile device, and identifying the mobile device as owned to the server.

32. The non-transitory computer-readable medium of claim 31 further including instructions for: establishing the home relationship by loading information identifying the mobile device into the server to allow the server to recognize the mobile device, and loading information identifying the server into the mobile device to enable the mobile device to interact with the server.

33. The non-transitory computer-readable medium of claim 32 further including instructions for:
requiring user authorization to create the home relationship.

34. The non-transitory computer-readable medium of claim 33 further including instructions for: after the creation of the home relationship is authorized by a user, allowing the user to set preferences that identify a set of services that are automatically performed between the mobile device and the server when a connection is made.

35. The non-transitory computer-readable medium of claim 34 wherein the automatic services may include any combination of: uploading data, downloading data, automated software or firmware updates, automatic system software selection and installation, automatic software installation for other network devices to support the mobile device, and special offerings.

36. The non-transitory computer-readable medium of claim 35 further including instructions for: utilizing partial data transfers when transferring data between the mobile device and the server such that when the connection with the local network is lost during a data transfer, the data transfer may resume when connection is established with another local network.

37. The non-transitory computer-readable medium of claim 35 wherein the automatic services include uploading images stored on the mobile device to the server, and downloading images from the server.

38. The non-transitory computer-readable medium of claim 37 further including instructions for: offering any combination of the following automatic services when an image is completely transferred: deleting the transferred image completely, deleting a full-size image and leaving a thumbnail image for display, and marking the transfer image has transferred.

39. The non-transitory computer-readable medium of claim 37 further including instructions for: displaying on the mobile device's display an icon or other mark to indicate that the image has been transferred.

40. The non-transitory computer-readable medium of claim 29 wherein the information stored in the mobile device when the established relationship was established includes a name, IP address of the server, or VPN information, and unique identification information, wherein the name, IP address of the server, or VPN information are used to establish communication with the home server, and the mobile device transmits the mobile device identifying information to the server to establish automatic access to the home network.

41. The non-transitory computer-readable medium of claim 40 further including instructions for: transmitting from the server to the device network identifying information.

42. The non-transitory computer-readable medium of claim 41 wherein the mobile device stores a first key of private/public key pair and the server stores a second key of the pair for encrypting/decrypting data exchanges between the mobile device and the server.

* * * * *